United States Patent
Zhu et al.

(10) Patent No.: US 11,113,795 B2
(45) Date of Patent: Sep. 7, 2021

(54) IMAGE EDGE PROCESSING METHOD, ELECTRONIC DEVICE, AND COMPUTER READABLE STORAGE MEDIUM

(71) Applicant: SHENZHEN CHINA STAR OPTOELECTRONICS TECHNOLOGY CO., LTD., Guangdong (CN)

(72) Inventors: Jiang Zhu, Guangdong (CN); Bin Zhao, Guangdong (CN); Yuhua Chang, Guangdong (CN); Yu Wu, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 539 days.

(21) Appl. No.: 16/080,629

(22) PCT Filed: May 23, 2018

(86) PCT No.: PCT/CN2018/088014
§ 371 (c)(1),
(2) Date: Aug. 28, 2018

(87) PCT Pub. No.: WO2019/200657
PCT Pub. Date: Oct. 24, 2019

(65) Prior Publication Data
US 2021/0158488 A1    May 27, 2021

(30) Foreign Application Priority Data
Apr. 16, 2018    (CN) .......................... 201810336646.5

(51) Int. Cl.
*G06T 5/00*    (2006.01)
*G06T 7/143*    (2017.01)
(Continued)

(52) U.S. Cl.
CPC .............. *G06T 5/003* (2013.01); *G06T 5/002* (2013.01); *G06T 5/20* (2013.01); *G06T 7/13* (2017.01); *G06T 7/143* (2017.01)

(58) Field of Classification Search
None
See application file for complete search history.

(56) References Cited

U.S. PATENT DOCUMENTS 5,638,138 A * 6/1997 Hickman ................. H04N 5/20
  348/645
5,961,461 A * 10/1999 Mo .......................... G06T 5/20
  600/443
(Continued)

FOREIGN PATENT DOCUMENTS

CN     1741068 A    3/2006
CN   101119448 A    2/2008
(Continued)

OTHER PUBLICATIONS

Wharton, Eric, Sos Agaian, and Karen Panetta. "A logarithmic measure of image enhancement." Mobile Multimedia/Image Processing for Military and Security Applications. vol. 6250. International Society for Optics and Photonics, 2006. (Year: 2006).*

*Primary Examiner* — Andrae S Allison
(74) *Attorney, Agent, or Firm* — Leong C. Lei (57) ABSTRACT

An image edge processing method is disclosed. The method includes steps of: extracting a brightness component from an input image; calculating an edge probability value mp of each pixel in the image according to the extracted brightness component; calculating an enhancement coefficient A for each pixel based on the edge probability value mp; performing a noise detection according to the brightness component, and determining if each pixel in the image is a noise point; when the pixel is not a noise point, performing a logarithmic processing to the pixel in order to obtain a data w; enhancing
(Continued)

an edge of the image according to the λ, the w and the brightness component in order to obtain an enhanced brightness component data; and after performing a brightness component synthesis according to the enhanced brightness component data, outputting an enhanced image. An electronic device and computer readable storage medium are also disclosed.

6 Claims, 5 Drawing Sheets

(51) Int. Cl.
*G06T 7/13* (2017.01)
*G06T 5/20* (2006.01)

(56) References Cited

U.S. PATENT DOCUMENTS

| | | | | |
|---|---|---|---|---|
| 6,611,627 | B1* | 8/2003 | LaRossa | G06T 5/10 382/240 |
| 6,771,320 | B2* | 8/2004 | Choi | H04N 5/20 348/625 |
| 7,352,410 | B2* | 4/2008 | Chou | G06T 5/009 348/673 |
| 7,388,621 | B2* | 6/2008 | Hsu | H04N 5/208 348/606 |
| 10,339,643 | B2* | 7/2019 | Tezaur | G06T 5/004 |
| 2007/0172146 | A1* | 7/2007 | Guan | G06T 5/002 382/275 |
| 2008/0027994 | A1* | 1/2008 | Guan | G06T 5/20 |
| 2010/0183240 | A1* | 7/2010 | Hiraga | G06T 5/20 382/264 |
| 2011/0050934 | A1* | 3/2011 | Mitsunaga | G06T 5/002 348/222.1 |
| 2014/0005971 | A1* | 1/2014 | Roessl | G01T 7/005 702/104 |
| 2016/0165096 | A1* | 6/2016 | Suzuki | G06T 5/20 382/266 |
| 2020/0286213 | A1* | 9/2020 | Unger | H04N 1/6027 |

FOREIGN PATENT DOCUMENTS

| | | | |
|---|---|---|---|
| CN | 102014243 A | | 4/2011 |
| CN | 105243651 | * | 1/2016 |
| CN | 105243651 A | | 1/2016 |
| KR | 94-010474 B1 | | 10/1994 |

* cited by examiner

| (j-1, i-1) | (j-1, i) | (j-1, i+1) |
| --- | --- | --- |
| (j, i-1) | (j, i) | (j, i+1) |
| (j+1, i-1) | (j+1, i) | (j+1, i+1) |

IMAGE EDGE PROCESSING METHOD, ELECTRONIC DEVICE, AND COMPUTER READABLE STORAGE MEDIUM

RELATED APPLICATIONS

The present application is a National Phase of International Application Number PCT/CN2018/088014, filed May 23, 2018, and claims the priority of China Application No. 201810336646.5, filed Apr. 16, 2018.

FIELD OF THE INVENTION

The present invention relates to an image edge processing method; an electronic device, and a computer readable storage medium.

BACKGROUND OF THE INVENTION

With the development of technology and the change of market demand, the size of display panels of electronic devices such as flat panel televisions has continuously increased, and people's demand for the quality of display have become higher and higher. However; after the image is converted or transmitted, the quality may be reduced and blurring may occur. The edge of the image is enhanced, so that the image quality is clear and sharp, and the visual experience is good, providing a higher-definition image for subsequent processing. The conventional technology enhances the image noise while enhancing the edges of the image. The fine texture of the image is also excessively enhanced and the image becomes unnatural.

SUMMARY OF THE INVENTION

The main object of the present invention is to provide an image edge processing method, an electronic device, and a computer readable storage medium, aiming to solve the problem of how to balance the processing of noise and details while enhancing the edge of the image.

In order to realize the above purpose, the present invention provides an image edge processing method; comprising steps of: extracting a brightness component from an input image; calculating an edge probability value mp of each pixel in the image according to the brightness component; calculating an enhancement coefficient A for each pixel based on the edge probability value mp; performing a noise detection according to the brightness component; and determining if each pixel in the image is a noise point; when the pixel is not a noise point, performing a logarithmic processing to the pixel in order to obtain a data w; enhancing an edge of the image according to the A, the w and the brightness component in order to obtain an enhanced brightness component data; and after performing a brightness component synthesis according to the enhanced brightness component data, outputting an enhanced image.

Optionally, the method further comprises a step of: when a pixel is a noise point, performing a Gaussian filtering to the pixel in order to perform a noise reduction.

Optionally, after the step of extracting a brightness component from an input image, the method comprise a step of: increasing the number of bits of the brightness component in order to calculate an edge probability value mp of each pixel in the image according to the brightness component after increasing the number of bits; after the step of obtaining an enhanced brightness component data, the method further comprises a step of: converting the enhanced brightness component data to a low bit through dithering in order to perform the brightness component synthesis according to the brightness component data after being converted.

Optionally; in the step of increasing the number of bits of the brightness component, converting the number of bits of the brightness component from 8 bit to 10 bit or 12 bit; in the step of converting the enhanced brightness component data to a low bit, converting the number of bits of the enhanced brightness component data from 10 bit or 12 bit to 8 bit.

Optionally, calculation formula of the edge probability value mp is:

$$f1=|y(j-1,i-1)+2*y(j-1,i)+y(j-1,i+1)-y(j+1,i-1)-2*y(j+1,i)-y(j+1,i+1)|;$$

$$f2=|y(j-1,i+1)+2*y(j,i+1)+y(j+1,i+1)-y(j-1,i-1)-2*y(j,i-1)-y(j+1,i-1)|;$$

$$f3=|Y(j,i-1)+2*y(j-1,i-1)+y(j-1,i)y(j+1,i)-2*y(j+1,i+1)-y(j,i+1)|;$$

$$f4=|y(j-1,i)+2*y(j-1,i+1)+y(j,i+1)-y(j,i-1)-2*y(j+1,i-1)-y(j+1,i)|;$$

mp (j, i)=max(f1f2f3f4); wherein, y(j, i) represents the brightness component of a pixel in the j-th row and i-th column, and mp(j, i) represents the edge probability value of a pixel (j, i).

Optionally, the noise detection comprises steps of: respectively calculating an absolute value of a brightness difference between a target pixel and neighboring pixels of the target pixel; comparing each calculated absolute value with a preset threshold value. If the calculated absolute value is smaller than the threshold value, a corresponding neighboring pixel is determined to be related to the target pixel, otherwise determined to be irrelevant; and counting the number of neighboring pixels related to the target pixel, if the number is 0 or 1, the target pixel is determined to be a noise point.

Optionally, the step of enhancing an edge of the image according to the A, the w and the brightness component comprises steps of: for each pixel, using a sharpening mask to perform a high-pass filtering to the data w, and outputting an E value; multiplying the E value with the enhancement coefficient A to obtain an enhancement value; and adding the enhancement value to the brightness component to obtain an enhanced brightness component data.

Optionally, the sharpening mask is a Laplacian operator or a Sobel operator.

Besides, in order to achieve the above purpose, the present invention also provides an electronic device, comprising: a memory; a processor; and an image edge processing program stored in the memory and capable of operating in the processor; wherein when the image edge processing program is executed by the processor, steps of the image edge processing method as described above is realized.

Besides, in order to achieve the above purpose, the present invention also provides a computer readable storage medium, wherein the computer readable storage medium is stored with an image edge processing program, when the image edge processing program is executed by a processor, steps of the image edge processing method as claimed in claim 1 is realized.

The image edge processing method, the electronic device and the computer readable storage medium provided by the invention can perform edge detection and noise detection on an image, calculate an enhancement coefficient after performing the edge detection, and determine a pixel of a noise point after performing the noise detection. When a pixel is determined to be noise point, a Gaussian filtering process is performed, when a pixel is determined to be not a noise point, the pixel is further enhanced. The outline of the output image is enhanced, the image becomes clear, and the quality of the image is improved.

The realization, function characteristics and advantages of the present invention will be further described with reference to the accompanying drawings in conjunction with the embodiments.

DETAILED DESCRIPTION OF PREFERRED EMBODIMENTS

It should be understood that the specific embodiments described herein are only used to explain the present invention and are not used to limit the present invention.

First Embodiment

Figure 1:
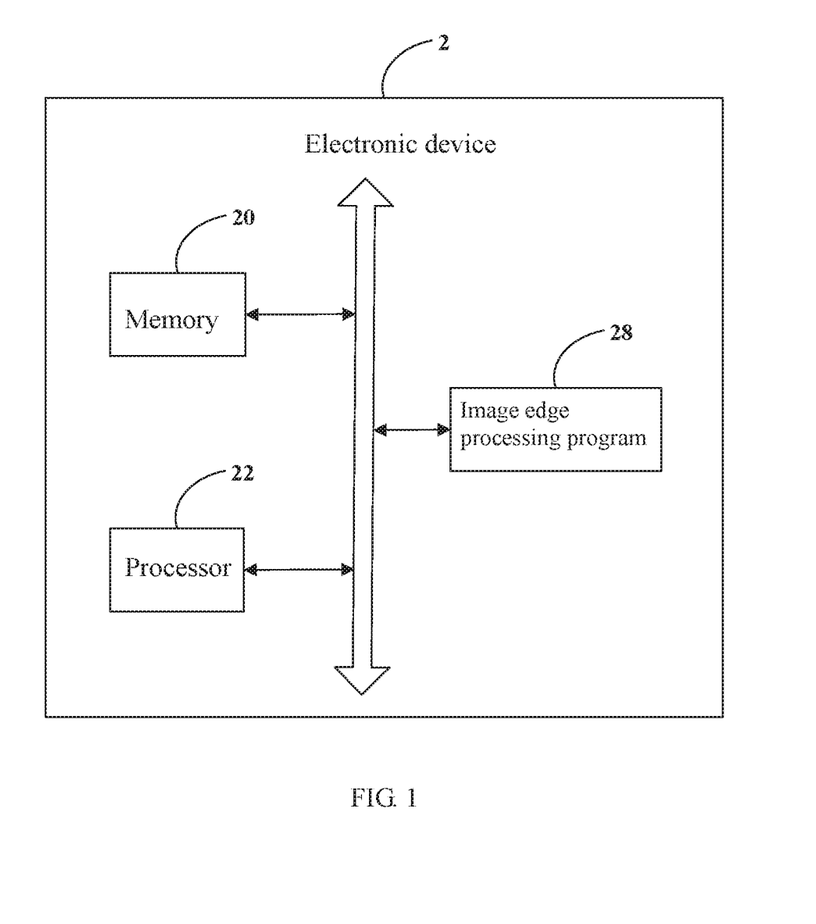
FIG. 1 is an architecture diagram of an electronic device according to a first embodiment of the present invention.

Referring to FIG. 1, the first embodiment of the present invention provides an electronic device 2. The electronic device 2 has an image display and image processing function and may be a flat panel television, a smart TV, a tablet computer, a mobile phone, or the like. The electronic device 2 includes a memory 20, a processor 22, and an image edge processing program 28.

The memory 20 includes at least one type of readable storage medium for storing an operating system and various types of application software installed on the electronic device 2, such as a program code of the image edge processing program 28. In addition, the memory 20 may also be used to temporarily store various types of data that have been outputted or will be outputted.

The processor 22 may be a Central Processing Unit (CPU), controller, microcontroller, microprocessor, or other data processing chip in some embodiments. The processor 22 is generally used to control the overall operation of the electronic device 2. In this embodiment, the processor 22 is configured to run program code or processing data stored in the memory 20, such as running the image edge processing program 28 and the like.

When the image edge processing program 28 is executed by the processor 22, the following steps are implemented:

(1) Extracting a brightness component from an input image.

(2) Increasing the number of bits of the brightness component.

(3) Calculating an edge probability value mp of each pixel in the image based on the brightness component after increasing the number of bits.

(4) Calculating an enhancement coefficient A for each pixel based on the edge probability value mp.

(5) Performing a noise detection based on the brightness component to determine if each pixel in the image is a noise point.

(6) When a pixel is a noise point, performing a Gaussian filtering to the pixel in order to perform a noise reduction.

(7) When a pixel is not a noise point, performing a logarithmic processing to the pixel to obtain a processed data w.

(8) Enhancing an edge of the image according to the A, w and brightness component to obtain an enhanced brightness component data.

(9) Converting the enhanced brightness component data to lower bits.

(10) After synthesizing the brightness component, outputting the enhanced image.

For detailed description of the above steps, please referring to a second embodiment and a third embodiment described below, which will not be described herein.

Figure 2:
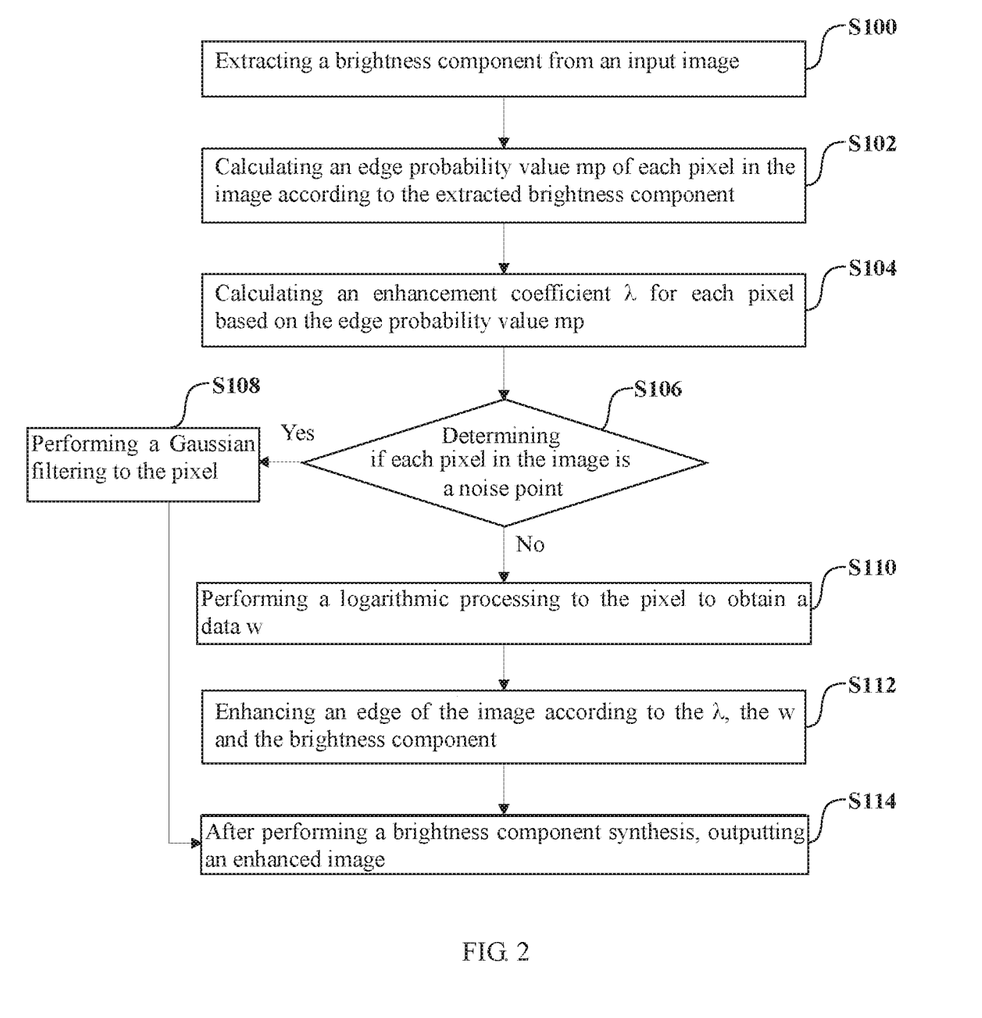
FIG. 2 is a flowchart of an image edge processing method according to a second embodiment of the present invention.

Those skilled in the art can understand that the structure shown in FIG. 2 does not constitute the limitation of the electronic device 2, and the electronic device 2 may also include other necessary components (such as a screen, etc.) or combining some components, or different components.

Second Embodiment

Referring to FIG. 2, the second embodiment of the present invention provides an image edge processing method applied to the electronic device 2. In this embodiment, according to different requirements, the execution order of the steps in the flowchart shown in FIG. 2 may be changed, and some steps may be omitted. The method includes the following steps:

S100, extracting a brightness component from an input image.

Specifically, in general, each pixel in one image may include a brightness component, a chroma component, and the like. When performing an edge enhancement for the image, firstly, obtaining an input image, and then extracting the brightness component of the image. The color space of the image can adopt YUV, HSL, or HSV.

S102: calculating an edge probability value mp of each pixel in the image according to the extracted brightness component.

Specifically, after the brightness component is extracted from the image, the brightness component of each pixel requires respectively performing an edge detection and a noise detection. After the edge detection, an edge probability value mp will be outputted. The value of mp can measure the probability that the pixel is at the edge.

Figure 4:
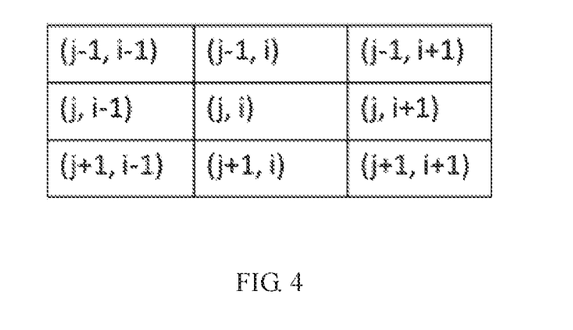
FIG. 4 is a schematic diagram of a target pixel and neighboring pixels in the present invention.

In this embodiment, the edge detection refers to calculating the edge probability value mp of a target pixel according to the brightness component corresponding to each pixel (the target pixel) and its neighboring pixels (the surrounding 8 pixels). As shown in FIG. 4, which is a schematic diagram of the target pixel and neighboring pixels of the target pixel. Wherein, the pixel (j, i) is the target pixel, and the other pixels are the adjacent pixels of the pixel (j, i). This step needs to inspect each target pixel in the image and calculate the corresponding edge probability value mp, respectively. For ease of calculation, the target pixel is calculated from a second row of the image to a second last row, corresponding to each line, calculating from the second pixel to the second to last pixel. Calculation formula is as following:

$$f1=|y(j-1,i-1)+2*y(j-1,i)+y(j-1,i+1)-y(j+1,i-1)-2*y(j+1,i)-y(j+1,i+1)|;$$

$$f2=|y(j-1,i+1)+2*y(j,i+1)+y(j+1,i+1)-y(j-1,i-1)-2*y(j,i-1)-y(j+1,i-1)|;$$

$$f3=|Y(j,i-1)+2*y(j-1,i-1)+y(j-1,i)y(j+1,i)-2*y(j+1,i+1)-y(j,i+1)|;$$

$$f4=|y(j-1,i)+2*y(j-1,i+1)+y(j,i+1)-y(j,i-1)-2*y(j+1,i-1)-y(j+1,i)|;$$

$$mp(j,i)=\max(f1,f2,f3,f4);$$

Wherein, y(j, i) represents the brightness component of a pixel in the j-th row and i-th column, and mp(j, i) represents the edge probability value of a pixel (j, i). The larger the edge probability value mp, the more likely the pixel is in the edge region.

S104: calculating an enhancement coefficient A for each pixel based on the edge probability value mp.

Figure 5:
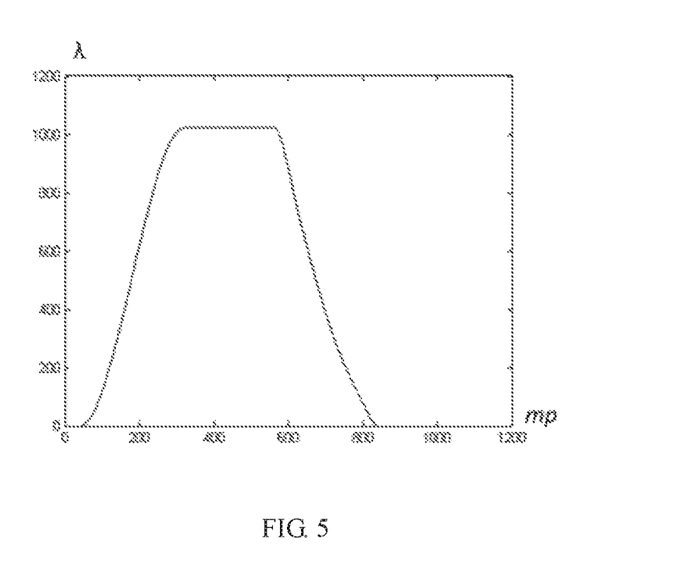
FIG. 5 is a schematic diagram of an enhancement coefficient calculation function curve in the present invention.

Specifically, for the edge probability value mp of each pixel in the image, after a weight value calculation, the enhancement coefficient A is outputted. In this embodiment, the enhancement coefficient A corresponding to each edge probability value mp can be searched in the enhancement coefficient calculation function curve. As shown in FIG. 5, which is a schematic diagram of the enhancement coefficient calculation function curve.

In FIG. 5, the horizontal axis indicates the edge probability value mp, and the vertical axis indicates the enhancement coefficient A. When the edge probability value mp is small, that is, the pixel is in a weak edge region, the corresponding enhancement coefficient A is smaller to protect the fine texture; when the edge probability value mp is larger, and the corresponding enhancement coefficient A is also smaller in order to prevent the enhanced data to overflow. After calculating the edge probability value mp of each pixel in the image, the enhancement coefficient A corresponding to each edge probability value mp is found from FIG. 5.

S106: performing a noise detection according to the brightness component, and determining if each pixel in the image is a noise point. When the pixel is a noise point, executing a step S108. When the pixel is not a noise point, executing a step S110.

Specifically, the process of noise detection includes:

(1) respectively calculating an absolute value of a brightness difference between a target pixel and neighboring pixels of the target pixel. The calculation formula is as following:

$$f1=|y(j,i)-y(j,i-1)|;$$

$$f2=|y(j,i)-y(j,i+1)|;$$

$$f3=|y(j,i)-y(j-1,i-1)|;$$

$$f4=|y(j,i)-y(j-1,i)|;$$

$$f5=|y(j,i)-y(j-1,i+1)|;$$

$$f6=|y(j,i)-y(j+1,i-1)|;$$

$$f7=|y(j,i)-y(1+1,i)|;$$

$$f8=|y(j,i)-y(1+1,i+1)|;$$

wherein y represents the brightness component corresponding to a pixel.

(2) Comparing each calculated absolute value with a preset threshold value. If the calculated absolute value is smaller than the threshold value, a corresponding neighboring pixel is determined to be related to the target pixel, otherwise determined to be irrelevant.

(3) Counting the number of neighboring pixels related to the target pixel. If the number is 0 or 1, the target pixel is determined to be a noise point. If the target pixel is a noise point, a noise reduction is required. On the contrary, the target pixel is required to be enhanced.

S108, performing a Gaussian filtering to the pixel.

Specifically, performing a Gaussian filtering to the pixel determined as a noise point in the image in order to reduce the noise.

S110: performing a logarithmic processing to the pixel in order to obtain a data w.

Figure 6:
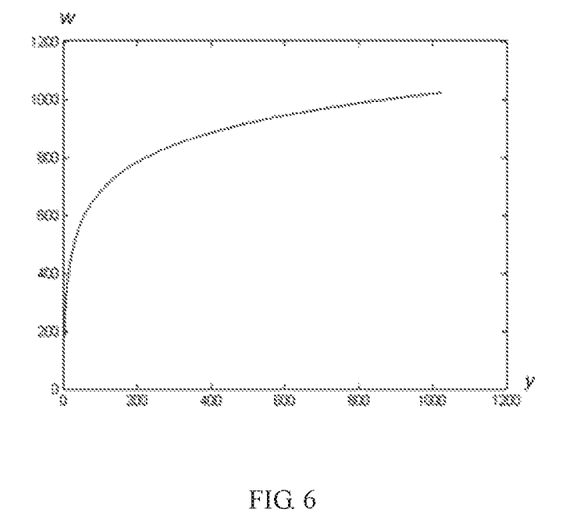
FIG. 6 is a schematic diagram of a logarithmic function curve in the present invention.

Specifically, for a pixel determined as a non-noise point in the image, the corresponding brightness component is logarithmically processed and then output w. As shown in FIG. 6, which is a schematic diagram of a logarithmic function curve. In FIG. 6, the horizontal axis represents the brightness component y, and the vertical axis represents the processed data w. The logarithmic processing mainly considers that the human visual characteristics include a logarithmic link. After the logarithmic processing, the details of the dark regions of the image can be sharpened more precisely, and the detail enhancement effect of the dark regions of the image is improved.

S112: enhancing an edge of the image according to the A, the w and the brightness component.

Figure 7:
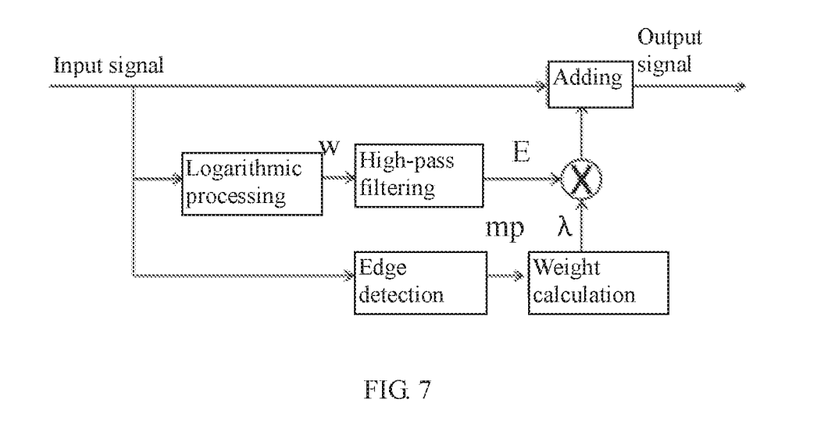
FIG. 7 is a schematic illustration of the process of un-sharp masking in the present invention.

Specifically, this step is called an un-sharpening masking process. As shown in FIG. 7, which is a schematic diagram of an un-sharpening masking process. The un-sharpening masking process includes: for each pixel, using a sharpening mask to perform a high-pass filtering to the data w after the logarithmic processing, and outputting an E value. The sharpening mask may be a Laplacian operator, a Sobel operator, or the like. The E value is multiplied with the enhancement coefficient A to obtain an enhancement value, and the enhancement value is added to the brightness component (input signal in FIG. 7) to obtain an enhanced brightness component data (output signal in FIG. 7).

S114: After performing a brightness component synthesis, outputting an enhanced image.

Specifically, the enhanced brightness component data and a corresponding chroma component and other data are synthesized, that is, inversely transformed into RGB data output through the corresponding color space.

The image edge processing method proposed in this embodiment can perform the edge detection and the noise detection in the image, and after the edge detection, the calculation of the enhancement coefficient is performed. After the noise detection, the pixel determined as a noise point performs a Gaussian filtering. The pixels that are judged as being not noise points are further enhanced. The outline of the output image is enhanced, the image becomes clear, and the quality of the image is improved.

Third Embodiment

Figure 3:
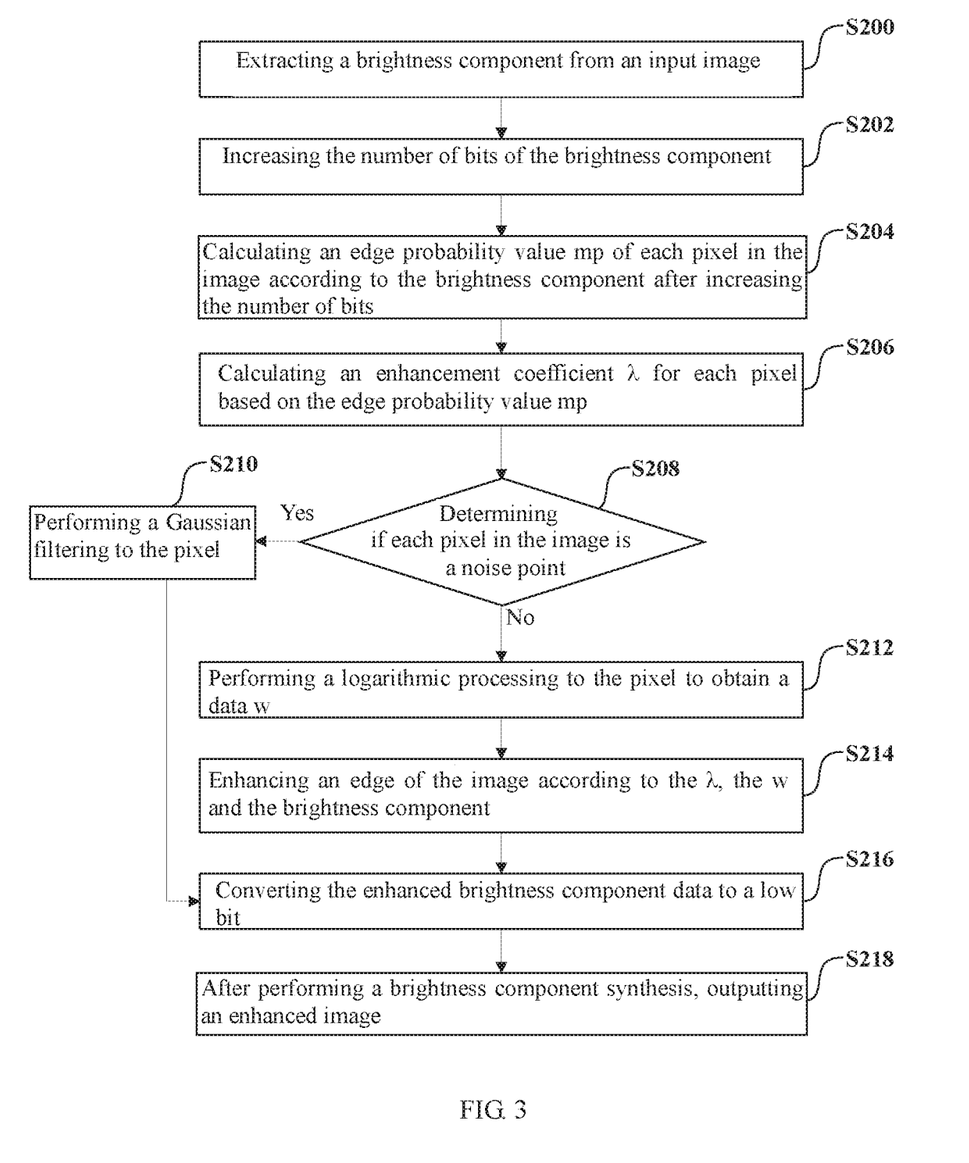
FIG. 3 is a flowchart of an image edge processing method according to a third embodiment of the present invention.

Referring to FIG. 3, the third embodiment of the present invention proposes an image edge processing method. In the third embodiment, the steps of the image edge processing method are similar to those of the second embodiment except that the method further includes steps S202 and S216.

The method includes the following steps:

S200, extracting a brightness component from an input image.

Specifically, in general, each pixel in one image may include a brightness component, a chrominance component, and the like. When performing an edge enhancement for the image, firstly, obtaining an input image, and then s extracting the brightness component of the image. The color space that the image can adopt YUV, HSL, or HSV.

S202: increasing the number of bits of the brightness component.

Specifically, the number of bits of the brightness component is converted from 8 bits to 10 bits or 12 bits or more.

S204: calculating an edge probability value mp of each pixel in the image according to the brightness component after increasing the number of bits.

Specifically, after the brightness component increases the number of bits, the brightness component of each pixel requires respectively performing an edge detection and a noise detection. After the edge detection, an edge probability value mp will be outputted. The value of mp can measure the probability that the pixel is at the edge.

In this embodiment, the edge detection refers to calculating the edge probability value mp of a target pixel according to the brightness component corresponding to each pixel (the target pixel) and its neighboring pixels (the surrounding 8 pixels). As shown in FIG. 4, which is a schematic diagram of the target pixel and neighboring pixels of the target pixel. This step needs to inspect each target pixel in the image and calculate the corresponding edge probability value mp, respectively. For ease of calculation, the target pixel is calculated from a second row of the image to a second last row, corresponding to each line, calculating from the second pixel to the second to last pixel. Calculation formula is as following:

$$f1=|y(j-1,i-1)+2*y(j-1,i)+y(j-1,i+1)-y(j+1,i-1)-2*y(j+1,i)-y(j+1,i+1)|;$$

$$f2=|y(j-1,i+1)+2*y(j,i+1)+y(j+1,i+1)-y(j-1,i-1)-2*y(j,i-1)-y(j+1,i-1)|;$$

$$f3=|Y(j,i-1)+2*y(j-1,i-1)+y(j-1,i)y(j+1,i)-2*y(j+1,i+1)-y(j,i+1)|;$$

$$f4=|y(j-1,i)+2*y(j-1,i+1)+y(j,i+1)-y(j,i-1)-2*y(j+1,i-1)-y(j+1,i)|;$$

$$mp(j,i)=\max(f1f2f3f4);$$

Wherein, y(j, i) represents the brightness component of ae pixel in the j-th row and i-th column, and mp(j, i) represents the edge probability value of a pixel (j, i). The larger the edge probability value mp, the more likely the pixel is in the edge region.

S206: calculating an enhancement coefficient A for each pixel based on the edge probability value mp.

Specifically, for the edge probability value mp of each pixel in the image, after a weight value calculation, the enhancement coefficient A is outputted. In this embodiment, the enhancement coefficient A corresponding to each edge probability value mp can be searched in the enhancement coefficient calculation function curve. As shown in FIG. 5, which is a schematic diagram of the enhancement coefficient calculation function curve.

In FIG. 5, the horizontal axis indicates the edge probability value mp, and the vertical axis indicates the enhancement coefficient A. When the edge probability value mp is small, that is, the pixel is in a weak edge region, the corresponding enhancement coefficient A is smaller to protect the fine texture; when the edge probability value mp is larger, and the corresponding enhancement coefficient A is also smaller in order to prevent the enhanced data to overflow. After calculating the edge probability value mp of each pixel in the image, the enhancement coefficient A corresponding to each edge probability value mp is found from FIG. 5.

S208: performing noise detection according to the brightness component, and determining if each pixel in the image is a noise point. When the pixel is a noise point, executing a step S210. When the pixel is not a noise point, executing a step S212.

Specifically, the process of noise detection includes:

(1) respectively calculating an absolute value of the brightness difference between a target pixel and neighboring pixels of the target pixel. The calculation formula is as following:

$$f1=|y(j,i)-y(j,i-1)|;$$

$$f2=|y(j,i)-y(j,i+1)|;$$

$$f3=|y(j,i)-y(j-1,i-1)|;$$

$$f4=|y(j,i)-y(j-1,i)|;$$

$$f5=|y(j,i)-y(j-1,i+1)|;$$

$$f6=|y(j,i)-y(j+1,i-1)|;$$

$$f7=|y(j,i)-y(1+1,i)|;$$

$$f8=|y(j,i)-y(1+1,i+1)|;$$

wherein y represents the brightness component corresponding to a pixel.

(2) Comparing each calculated absolute value with a preset threshold value. If the calculated absolute value is smaller than the threshold value, a corresponding neighboring pixel is determined to be related to the target pixel, otherwise determined to be irrelevant.

(3) Counting the number of neighboring pixels related to the target pixel. If the number is 0 or 1, the target pixel is determined to be a noise point. If the target pixel is a noise point, a noise reduction is required. On the contrary, the target pixel is required to be enhanced.

S210, performing a Gaussian filtering to the pixel.

Specifically, performing a Gaussian filtering to the pixel determined as a noise point in the image in order to reduce the noise.

S212: performing logarithmic processing to the pixel in order to obtain a processed data w.

Specifically, for a pixel determined as being not a noise point in the image, the corresponding brightness component is logarithmically processed and then output w. As shown in FIG. 6, which is a schematic diagram of a logarithmic function curve. In FIG. 6, the horizontal axis represents the brightness component y, and the vertical axis represents the processed data w. The logarithmic processing mainly considers that the human visual characteristics include a logarithmic link. After the logarithmic processing, the details of the dark regions of the image can be sharpened more precisely, and the detail enhancement effect of the dark regions of the image is improved.

S214: enhancing an edge of the image according to the A, w and the brightness component.

Specifically, this step is called an un-sharpening masking process. As shown in FIG. 7, which is a schematic diagram of an un-sharpening masking process. The un-sharpening masking process includes: for each pixel, using a sharpening mask to perform a high-pass filtering to the data w after the logarithmic processing, and outputting an E value. The sharpening mask may be a Laplacian operator, a Sobel operator, or the like. The E value is multiplied with the enhancement coefficient A to obtain an enhancement value, and the enhancement value is added to the brightness component (input signal in FIG. 7) to obtain an enhanced brightness component data (output signal in FIG. 7).

S216: converting the enhanced brightness component data to a low bit.

Specifically, the enhanced brightness component data is dithered to shift from a high bit (10 bits or 12 bits) to a low bit (8 bits).

S218: performing a brightness component synthesis to output an enhanced image.

Specifically, synthesizing the converted brightness component data and a corresponding chroma component, that is, inversely converted into RGB data to output through a corresponding color space.

The image edge processing method proposed in this embodiment first converts the brightness component into a high bit to perform calculation, and then reduces the brightness component from a high bit to a low bit by a dithering display, thereby improving the operation accuracy and making the image processing effect better.

Fourth Embodiment

Another embodiment of the present invention provides a computer-readable storage medium having an image edge processing program stored therein. The image edge processing program may be executed by at least one processor. The at least one processor is used to perform the steps of the image edge processing method as described above.

It should be noted that, in the present context, the terms "include", "including" or any other variations thereof are intended to cover non-exclusive inclusions such that a process, method, article, or apparatus that includes a series of elements includes not only those elements but also includes other elements that are not explicitly listed, or elements that are inherent to such processes, methods, articles, or devices. In the case of no more limitation, the element defined by the sentence "includes a . . . " does not exclude the presence of another identical element in the process, method, article, or apparatus that includes the element.

The sequence numbers of the foregoing embodiments of the present invention are merely for description and do not represent the advantages and disadvantages of the embodiments.

Through the description of the above embodiments, those skilled in the art can clearly understand that the above embodiment method can be implemented by means of software plus a necessary general hardware platform. Of course, the hardware can also be used, but in many cases, the former is better for implementation. Based on this understanding, the part of the technical solution of the present invention that essentially or contributing to the prior art can be embodied in the form of a software product stored in a storage medium (such as a ROM/RAM, a magnetic disk, an optical disk), including several instructions used to enable a terminal (which may be a mobile phone, a computer, a server, an air conditioner, or a network device, etc.) to perform the methods described in the various embodiments of the present invention.

The embodiments of the present invention have been described above with reference to the accompanying drawings, but the present invention is not limited to the above specific embodiments. The above specific embodiments are merely illustrative and not limitative, and those skilled in the art are in the light of the present invention, many forms may be made without departing from the scope of the present invention and the protection scope of the claims, and these are all included in the protection scope of the present invention,

What is claimed is:

1. An image edge processing method, comprising steps of:
extracting a brightness component from an input image;
calculating an edge probability value mp of each pixel in the image according to the brightness component;
calculating an enhancement coefficient λ for each pixel based on the edge probability value mp;
performing a noise detection according to the brightness component, and determining if each pixel in the image is a noise point;
when the pixel is not a noise point, performing a logarithmic processing to the pixel in order to obtain a data w;
enhancing an edge of the image according to the λ, the w and the brightness component in order to obtain an enhanced brightness component data; and
after performing a brightness component synthesis according to the enhanced brightness component data, outputting an enhanced image;
wherein the method further comprises a step of:
when a pixel is a noise point, performing a Gaussian filtering to the pixel in order to perform a noise reduction;
wherein after the step of extracting a brightness component from an input image, the method comprise a step of: increasing the number of bits of the brightness component in order to calculate an edge probability value mp of each pixel in the image according to the brightness component after increasing the number of bits; and
after the step of obtaining an enhanced brightness component data, the method further comprises a step of: converting the enhanced brightness component data to a low bit through dithering in order to perform the brightness component synthesis according to the brightness component data after being converted.

2. The image edge processing method according to claim 1, wherein in the step of increasing the number of bits of the brightness component, converting the number of bits of the brightness component from 8 bit to 10 bit or 12 bit;
in the step of converting the enhanced brightness component data to a low bit, converting the number of bits of the enhanced brightness component data from 10 bit or 12 bit to 8 bit.

3. The image edge processing method according to claim 1, wherein calculation formula of the edge probability value mp is:

$$f1=|y(j-1,i-1)+2*y(j-1,i)+y(j-1,i+1)-y(j+1,i-1)-2*y(j+1,i)-y(j+1,i+1)|;$$

$$f2=|y(j-1,i+1)+2*y(j,i+1)+y(j+1,i+1)-y(j-1,i-1)-2*y(j,i-1)-y(j+1,i-1)|;$$

$$f3=|y(j,i-1)+2*y(j-1,i-1)+y(j-1,i)-y(j+1,i)-2*y(j+1,i+1)-y(j,i+1)|;$$

$$f4=|y(j-1,i)+2*y(j-1,i+1)+y(j,i+1)-y(j,i-1)-2*y(j+1,i-1)-y(j+1,i)|;$$

$$mp(j,i)=\max(f1,f2,f3,f4);$$

wherein, y(j, i) represents the brightness component of a pixel in the j-th row and i-th column, and mp(j, i) represents the edge probability value of a pixel (j, i).

4. The image edge processing method according to claim 1, wherein the noise detection comprises steps of:

respectively calculating an absolute value of a brightness difference between a target pixel and neighboring pixels of the target pixel;

comparing each calculated absolute value with a preset threshold value, if the calculated absolute value is smaller than the threshold value, a corresponding neighboring pixel is determined to be related to the target pixel, otherwise determined to be irrelevant; and counting the number of neighboring pixels related to the target pixel, if the number is 0 or 1, the target pixel is determined to be a noise point.

5. The image edge processing method according to claim 1, wherein the step of enhancing an edge of the image according to the λ, the w and the brightness component comprises steps of:

for each pixel, using a sharpening mask to perform a high-pass filtering to the data w, and outputting an E value;

multiplying the E value with the enhancement coefficient λ to obtain an enhancement value; and adding the enhancement value to the brightness component to obtain an enhanced brightness component data.

6. The image edge processing method according to claim 5, wherein the sharpening mask is a Laplacian operator or a Sobel operator.

* * * * *